(12) United States Patent
Takahashi et al.

(10) Patent No.: US 10,108,163 B2
(45) Date of Patent: Oct. 23, 2018

(54) PRODUCTION MANAGEMENT APPARATUS, PRODUCTION MANAGEMENT METHOD AND RECORDING MEDIUM

(71) Applicant: Toshiba Memory Corporation, Minato-Ku, Tokyo (JP)

(72) Inventors: Kensuke Takahashi, Yokkaichi Mie (JP); Katsumi Yamada, Yokkaichi Mie (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 501 days.

(21) Appl. No.: 14/616,109

(22) Filed: Feb. 6, 2015

(65) Prior Publication Data

US 2016/0070250 A1   Mar. 10, 2016

Related U.S. Application Data

(60) Provisional application No. 62/046,035, filed on Sep. 4, 2014.

(51) Int. Cl.
*G05B 19/042* (2006.01)
*G05B 19/418* (2006.01)

(52) U.S. Cl.
CPC ... *G05B 19/0426* (2013.01); *G05B 19/41865* (2013.01); *G05B 2219/2602* (2013.01); *G05B 2219/31427* (2013.01); *G05B 2219/32424* (2013.01); *Y02P 90/20* (2015.11)

(58) Field of Classification Search
CPC .......... G05B 19/0426; G05B 19/41865; G05B 2219/2602; G05B 2219/31427; G05B 2219/32424
See application file for complete search history.

(56) References Cited

U.S. PATENT DOCUMENTS

| 6,463,350 | B2 | 10/2002 | Fukuda et al. |
| 6,516,237 | B1 * | 2/2003 | Aoki ............ G05B 17/02 700/109 |
| 6,907,308 | B1 * | 6/2005 | Bartlett ......... G05B 19/41865 700/121 |
| 2002/0103556 | A1 * | 8/2002 | Yasuda ........... G05B 19/4183 700/95 |

(Continued)

FOREIGN PATENT DOCUMENTS

| JP | 2000012414 A | 1/2000 |
| JP | 2000068356 A | 3/2000 |

(Continued)

*Primary Examiner* — Dennis M Butler
(74) *Attorney, Agent, or Firm* — Holtz, Holtz & Volek PC (57) ABSTRACT

In one embodiment, a production management apparatus includes a flow obtaining module configured to obtain a plurality of processing flows to process a wafer from a flow storage module. The apparatus further includes a route creating module configured to select a plurality of steps from the plurality of processing flows, and configured to create a processing route to execute the plurality of steps selected from the plurality of processing flows. The apparatus further includes a flow creating module configured to select a plurality of steps from the processing route, and configured to create a new processing flow including the plurality of steps selected from the processing route.

5 Claims, 8 Drawing Sheets

(56) References Cited

U.S. PATENT DOCUMENTS

2005/0090924 A1* 4/2005 Hsu .................. G05B 19/4184
700/112

FOREIGN PATENT DOCUMENTS

| JP | 2005208889 A | 8/2005 |
|----|--------------|--------|
| JP | 2005208891 A | 8/2005 |
| JP | 2010010253 A | 1/2010 |

* cited by examiner

PRODUCTION MANAGEMENT APPARATUS, PRODUCTION MANAGEMENT METHOD AND RECORDING MEDIUM

CROSS REFERENCE TO RELATED APPLICATION

This application is based upon and claims the benefit of priority from the prior U.S. Provisional Patent Application No. 62/046,035 filed on Sep. 4, 2014, the entire contents of which are incorporated herein by reference.

FIELD

Embodiments described herein relate to a production management apparatus, a production management method and a recording medium.

BACKGROUND

When trial semiconductor devices are to be produced, various processing flows to process wafers are created, a preferable processing flow is selected from these processing flows, and the preferable processing flow is officially adapted to produce the semiconductor devices. In this case, since a large number of the processing flows need to be created, there is a need for a method of creating these processing flows efficiently.

Furthermore, the wafers are generally processed per lot which is a trading or processing unit of the wafers. For example, a single lot consists of 25 wafers. However, when a processing flow for small pieces of wafers or the like is to be created, there is a case to create the processing flow to simultaneously process the wafers whose number is less than the single lot. In this case, there is a need for a method of efficiently creating and managing the processing flow of the wafers whose number is less than the single lot.

DETAILED DESCRIPTION

Embodiments will now be explained with reference to the accompanying drawings.

In one embodiment, a production management apparatus includes a flow obtaining module configured to obtain a plurality of processing flows to process a wafer from a flow storage module. The apparatus further includes a route creating module configured to select a plurality of steps from the plurality of processing flows, and configured to create a processing route to execute the plurality of steps selected from the plurality of processing flows. The apparatus further includes a flow creating module configured to select a plurality of steps from the processing route, and configured to create a new processing flow including the plurality of steps selected from the processing route.

First Embodiment

Figure 1:
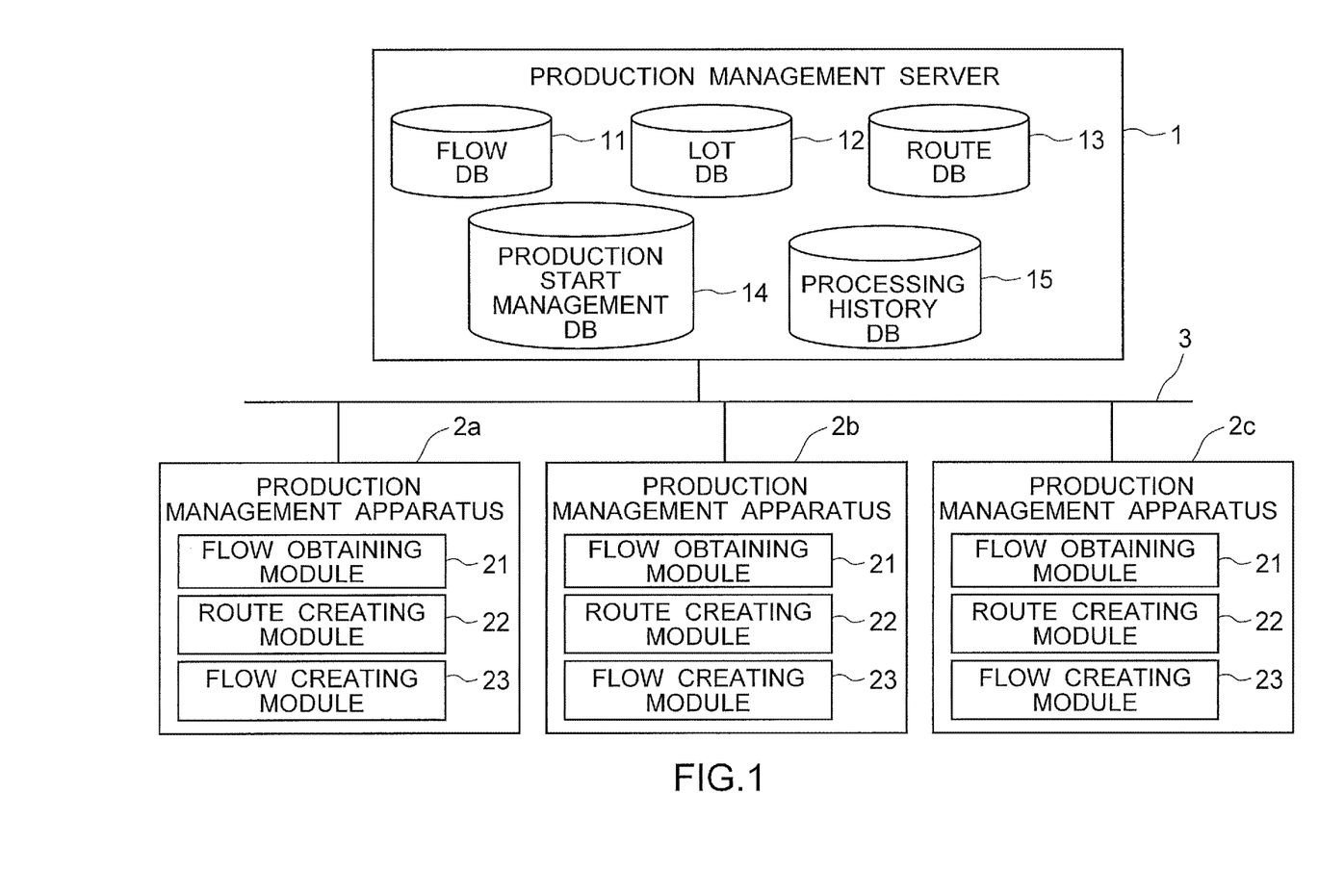
FIG. 1 is a schematic view illustrating a structure of a production management system of a first embodiment.

FIG. 1 is a schematic view illustrating a structure of a production management system of a first embodiment. A production management system of FIG. 1 includes a production management server 1, production management apparatuses 2a to 2c and a network 3.

[Production Management Server 1]

The production management server 1 includes a flow database (DB) 11 as an example of a flow storage module, a lot DB 12, a route DB 13 as an example of a route storage module, a production start management DB 14, and a processing history DB 15 as an example of a history storage module. An example of the production management server 1 is a server apparatus.

The flow DB 11 is used to store various processing flows (master flows) for processing wafers. The lot DB 12 is used to store lot information of wafers for producing trial semiconductor devices.

In the present embodiment, a processing route to process the wafers registered in the lot DB 12 is created using the processing flows in the flow DB 11. Also, steps included in the processing route are executed by using semiconductor production apparatuses which have been prepared for steps of the processing flows. Examples of these steps include a deposition step, an etching step, an impurity implanting step, an annealing step, a polishing step and the like. The trial semiconductor devices of the present embodiment are produced by using (diverting) the semiconductor production apparatuses for the processing flows along the processing route.

The route DB 13 is used to store information of execution scheduled steps of the processing route. The production start management DB 14 is used to store information as to whether each step of the processing route has been or has not been executed. The history management DB 15 is used to store an execution history of each step of the processing route. Accordingly, the route DB 13 stores the information of unexecuted steps of the processing route, while the history management DB 15 stores the information of executed steps of the processing route.

In the present embodiment, a new processing flow (new master flow) is created by using the steps of the processing route stored in the route DB 13 and the history management DB 15. Specifically, the new processing flow is created by using the unexecuted steps and the executed steps of the processing route. The new processing flow of the present embodiment is then registered in the flow DB 11.

[Production Management Apparatuses 2a to 2c]

Each of the production management apparatuses 2a to 2c includes a flow obtaining module 21, a route creating module 22 and a flow creating module 23. An example of the production management apparatuses 2a to 2c is personal computers.

The flow obtaining module 21 obtains a plurality of processing flows from the flow DB 11 via the network 3. The flow obtaining module 21 also obtains the lot information of the wafers of the trial semiconductor devices from the lot DB 12 via the network 3.

The route creating module 22 selects a plurality of steps from the processing flows, and creates the processing route to execute these steps selected from the processing flows. The route creating module 22 also determines a lot to which the processing route is applied. The information of the steps of the processing route is stored in the route DB 13 via the network 3 with the lot information to which this processing route is applied.

The flow creating module 23 accesses the route DB 13 and the history management DB 15 via the network 3, selects the unexecuted and executed steps of the processing route, and creates the new processing flow including these steps selected from the processing route. The new processing flow may include the unexecuted steps alone or the executed steps alone. Alternatively, the new processing flow may include both the unexecuted and executed steps. The flow creating module 23 registers (stores) the new processing flow in the flow DB 11 via the network 3.

The flow creating module 23 may obtain the information of the unexecuted and executed steps of the processing route from the production start management DB 14. In this case, the production start management DB 14 is an example of the route storage module and the history storage module.

[Network 3]

The network 3 connects the production management server 1 and the production management apparatuses 2a to 2c, and is used for communication among them. An example of the network 3 is a local area network (LAN).

Although the production management system of FIG. 1 includes one production management server 1, it may include two or more production management servers 1. Also, the number of the production management apparatuses 2a to 2c may be other than three in the production management system of FIG. 1.

Figure 2:
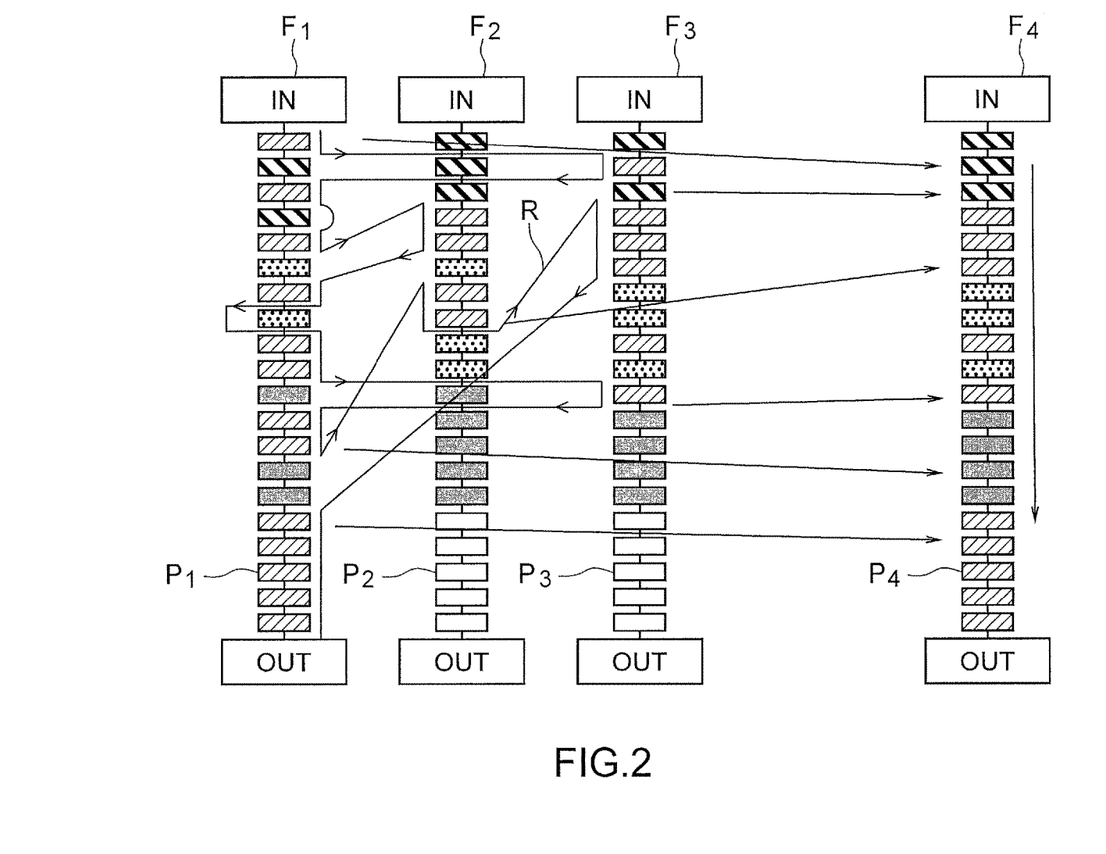
FIG. 2 is a diagram for explaining a procedure of creating a new processing flow of the first embodiment.

FIG. 2 is a diagram for explaining a procedure of creating a new processing flow of the first embodiment.

FIG. 2 illustrates first to third processing flows $F_1$ to $F_3$ registered in the flow DB 11, and a new processing flow $F_4$ created from the first to third processing flows $F_1$ to $F_3$. Regarding the processing flows $F_1$ to $F_4$, FIG. 2 illustrates the steps between a stage of putting wafers in a clean room and a stage of putting out the wafers from the clean room. Steps of the first to third processing flows $F_1$ to $F_3$ are indicated by reference signs $P_1$ to $P_3$. Steps of the new processing flow $F_4$ are indicated by a reference sign $P_4$.

The new processing flow $F_4$ is created by the following procedures. First, the flow obtaining module 21 of one of the production management apparatuses 2a to 2c obtains the first to third processing flows $F_1$ to $F_3$ from the flow DB 11. Next, the route creating module 22 selects a plurality of steps from the first to third processing flows $F_1$ to $F_3$, and creates a processing route R to execute these steps selected from the first to third processing flows $F_1$ to $F_3$. Next, the flow creating module 23 selects a plurality of steps from the processing route R, and creates the new processing flow $F_4$ including these steps selected from the processing route R. After that, the new processing flow $F_4$ is registered in the flow DB 11.

When the flow creating module 23 selects the plurality of steps from the processing route R, the flow creating module 23 selects only necessary steps and excludes unnecessary steps from the selection, for example. Accordingly, the new processing flow $F_4$ including some steps of the processing route R is created. The flow creating module 23 may create the new processing flow $F_4$ including all steps of the processing route R. When the flow creating module 23 creates the new processing flow $F_4$ by selecting the plurality of steps from the processing route R, the flow creating module 23 may change the order of execution of the steps.

Figure 3:
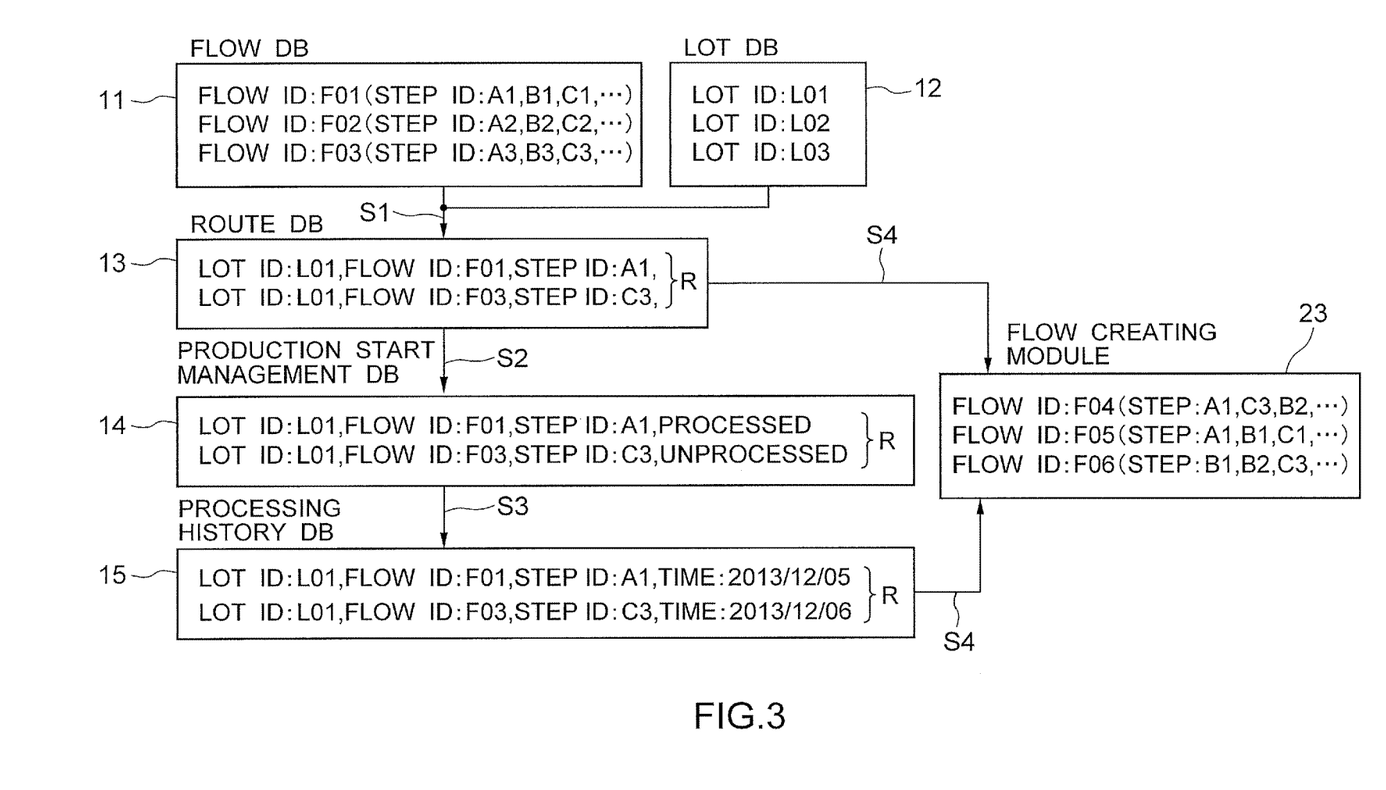
FIG. 3 is a chart for explaining a production management method of the first embodiment.

FIG. 3 is a chart for explaining a production management method of the first embodiment. The production management method of FIG. 3 is executed by the production management system of FIG. 1.

FIG. 3 illustrates flow IDs registered in the flow DB 11. A processing flow of the flow ID "F01" includes steps A1, B1 and C1. A processing flow of the flow ID "F02" includes steps A2, B2 and C2. A processing flow of the flow ID "F03" includes steps A3, B3 and C3.

FIG. 3 further illustrates lot IDs registered in the lot DB 12. The lot DB 12 manages three lots of lot IDs "L01", "L02" and "L03".

In FIG. 3, the route creating module 22 of one of the production management apparatuses 2a to 2c creates the processing route R of the lot having the lot ID "L01" (step S1). The route DB 13 manages the step A1 of the flow ID "F01" and the step C3 of the flow ID "F03" as the unexecuted steps of the processing route R.

When execution of the route R is started, the information of the steps of the processing route R is stored in the production start management DB 14 of the reserved order of production start (step S2). FIG. 3 illustrates that the step A1 of the flow ID "F01" has been executed, while the step C3 of the flow ID "F03" is unexecuted.

The execution history of the executed steps of the processing route R is stored in the processing history DB 15 (step S3). The processing history DB 15 of FIG. 3 manages, as the execution history, completion time of the step A1 of the flow ID "F01", and completion time of the step C3 of the flow ID "F03".

The flow creating module 23 of the present embodiment accesses the route DB 13 and the history management DB 15, selects the unexecuted and executed steps of the processing route R, and creates a new processing flow including these steps (step S4). The new processing flow is provided with a new flow ID and stored in the flow DB 11. FIG. 3 illustrates new processing flows of the flow IDs "F04", "F05" and "F06".

The order of execution of the steps included in the processing route R can be known from the order of the steps in the production start management DB 14 or the completion time of individual steps registered in the processing history DB 15. When it is necessary to know the information of the order of execution of the steps selected from the processing route R, it can be known to the flow creating module 23 from the information in the production start management DB 14 or the processing history DB 15.

As described above, the production management apparatuses 2a to 2c of the present embodiment obtain the plurality of processing flows to process the wafers from the flow DB 11, select a plurality of steps from the processing flows to create the processing route, and select unexecuted and executed steps from the processing route to create a new processing flow.

Therefore, when the trial semiconductor devices are to be produced, the present embodiment makes it possible to create the processing route easily by using the existing processing flows and to produce the trial semiconductor devices along this processing route. In this case, if the semiconductor production apparatuses have been prepared for the steps of the existing processing flows, the trial semiconductor devices can be produced by using (diverting) these semiconductor production apparatuses.

In the present embodiment, when the trial semiconductor devices are to be produced, the new processing flow is created from the existing processing flows via the processing route, instead of directly creating the new processing flow from the existing processing flows. Therefore, it is not necessary in the present embodiment to create a large number of new processing flows. Instead, it is sufficient in the present embodiment to create a new processing flow from the steps of the processing route only when all or part of the processing route has been executed to know that the processing route is preferable. According to the present embodiment, it is possible to efficiently create the new processing flow when the trial semiconductor devices are to be produced.

Second Embodiment

Figure 4:
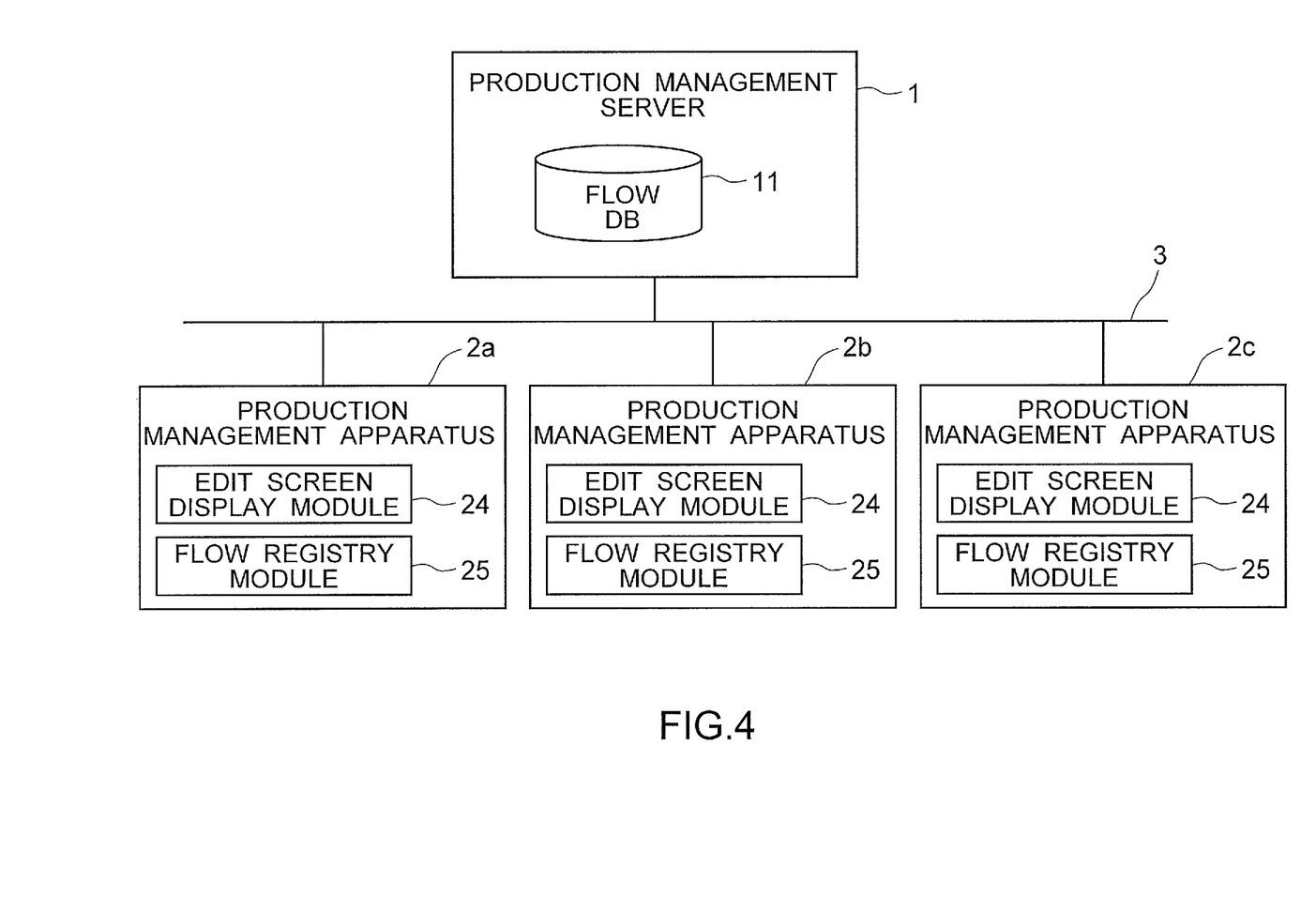
FIG. 4 is a schematic view illustrating a structure of a production management system of a second embodiment.

FIG. 4 is a schematic view illustrating a structure of a production management system of a second embodiment. The production management system of FIG. 4 includes a production management server 1, production management apparatuses 2a to 2c and a network 3.

The production management server 1 includes a flow DB 11 as an example of the flow storage module. The flow DB 11 of the present embodiment has a function similar to that of the flow DB 11 of the first embodiment.

Each of the production management apparatuses 2a to 2c includes an edit screen display module 24 and a flow registry module 25. The edit screen display module 24 displays an edit screen capable of editing processing flows to process wafers on the display of each production management apparatus 2a to 2c. The flow registry module 25 registers the processing flows edited on the edit screen in the flow DB 11 via the network 3.

The network 3 connects the production management server 1 and the production management apparatuses 2a to 2c, and is used for communication among them.

Figure 5:
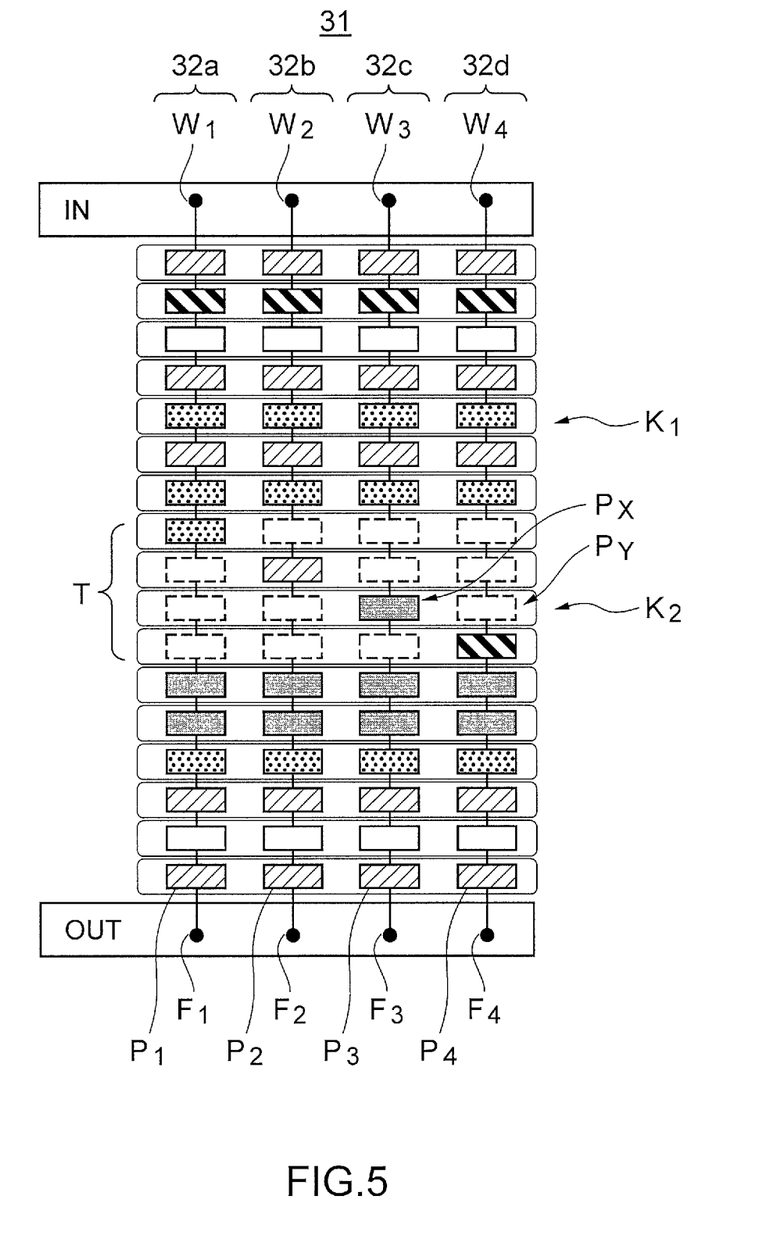
FIG. 5 is a diagram illustrating an edit screen of a production management method of the second embodiment.

FIG. 5 is a diagram illustrating an edit screen 31 of a production management method of the second embodiment.

FIG. 5 illustrates the edit screen 31 for editing the first to fourth processing flows $F_1$ to $F_4$ to process first to fourth wafers $W_1$ to $W_4$, respectively. Steps of the first to fourth processing flows $F_1$ to $F_4$ are indicated by reference signs $P_1$ to $P_4$. The edit screen 31 of FIG. 5 shows the steps $P_1$ to $P_4$ between a stage of putting the first to fourth wafers $W_1$ to $W_4$ in a clean room and a stage of putting out the first to fourth wafers $W_1$ to $W_4$ from the clean room. The number of wafers $W_1$ to $W_4$ to be displayed on the edit screen 31 of the present embodiment may be N wafers (N is an integer of two or more) other than four wafers.

The edit screen 31 includes first to fourth editing areas 32a to 32d which respectively display the steps $P_1$ to $P_4$ of the first to fourth processing flows $F_1$ to $F_4$ and are respectively capable of editing the steps $P_1$ to $P_4$ of the first to fourth processing flows $F_1$ to $F_4$. For example, when a step $P_1$ of the first processing flow $F_1$ is to be edited, a mouse pointer is moved to the first editing area 32a to operate the step $P_1$ in the first editing area 32a. The first to fourth processing flows $F_1$ to $F_4$ having been edited on the edit screen 31 are registered in the flow DB 11.

For example, the edit screen 31 is used to create processing flows to simultaneously process a group of wafers less than a single lot, such as the first to fourth wafers $W_1$ to $W_4$. Examples of the first to fourth wafers $W_1$ to $W_4$ are small pieces of wafers.

When a general production management method creates the processing flows to simultaneously process the group of wafers, it creates a single processing flow for the group of wafers, and sets steps unique to each wafer by branching the processing flow. In this case, as the number of the branches increases, the processing flow becomes complicated. This causes a problem that it is difficult to create such a processing flow that includes a lot of unique steps for each wafer.

Meanwhile, the edit screen 31 of the present embodiment is capable of editing the first to fourth processing flows $F_1$ to $F_4$ for the first to fourth wafers $W_1$ to $W_4$ of the wafer group, respectively. Therefore, the edit screen 31 of the present embodiment is capable of setting the steps unique to each wafer without the branches. Accordingly, the present embodiment makes it possible to easily create the first to fourth processing flows $F_1$ to $F_4$ including many steps unique to each wafer.

The edit screen 31 of the present embodiment is capable of setting common steps to simultaneously process the first to fourth wafers $W_1$ to $W_4$. An arrow $K_1$ indicates a stage where the first to fourth wafers $W_1$ to $W_4$ are processed in a common step. In the common step, the first to fourth wafers $W_1$ to $W_4$ are processed simultaneously in the same semiconductor production apparatus. When the common step is to be set in the stage $K_1$, the stage $K_1$ area is clicked with a mouse to select the type of the common step.

The first to fourth editing areas 32a to 32d of the present embodiment are respectively capable of editing a setting whether the common steps should be applied to the first to fourth wafers $W_1$ to $W_4$. An arrow $K_2$ indicates a stage where a common step $P_X$ is applied to the third wafer $W_3$ and a dummy step $P_Y$ is applied to the fourth wafer $W_4$. In the present embodiment, the setting not to apply the common step $P_X$ to a step $P_4$ in the stage $K_2$ can be edited by clicking the step $P_4$ with the mouse in the stage $K_2$ of the fourth editing area 32d and setting the dummy step $P_Y$ in the step $P_4$. In the dummy step $P_Y$, the common step $P_X$ is skipped without being executed.

Stages where dummy steps have been applied are indicated by a reference sign T. The present embodiment makes it possible, by setting such a stage T on the edit screen 31, to allow the steps unique to each wafer to be set without using branches.

In this way, the common steps can be set for each wafer group, and the dummy steps can be set for each wafer in the present embodiment. Therefore, the flow registry module 25 of the present embodiment registers the information of the common steps in the flow DB 11 for each wafer group, and the information of the dummy steps in the flow DB 11 for each wafer. Therefore, the present invention makes it possible to compress the information amount to be registered, compared to the case where all information of the steps $P_1$ to $P_4$ of the first to fourth processing flows $F_1$ to $F_4$ are registered for each wafer.

Figure 6:
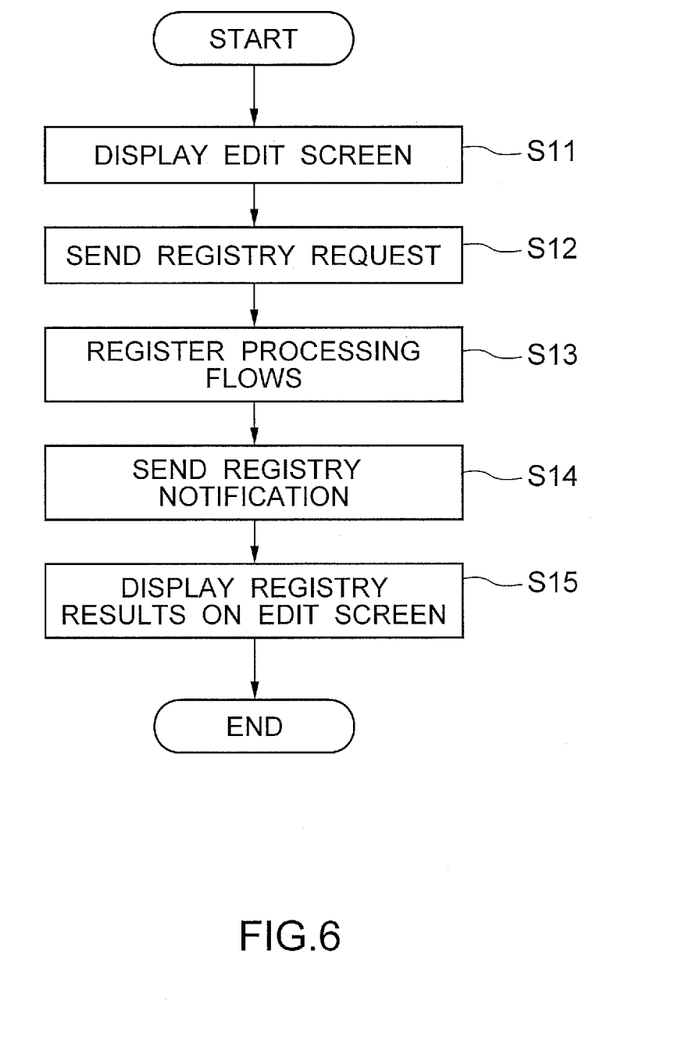
FIG. 6 is a flowchart illustrating an example of the production management method of the second embodiment.

FIG. 6 is a flowchart illustrating an example of the production management method of the second embodiment.

First, the edit screen display module 24 displays the edit screen 31 including the first to fourth editing areas 32a to 32d (step S11). The user of the edit screen 31 edits the first to fourth processing flows $F_1$ to $F_4$ on the edit screen 31, and performs a registry operation of the edited first to fourth processing flows $F_1$ to $F_4$. Consequently, a registry request for the edited first to fourth processing flows $F_1$ to $F_4$ is sent from the edit screen display module 24 to the flow registry module 25 (step S12).

Next, the flow registry module 25 registers the edited first to fourth processing flows $F_1$ to $F_4$ in the flow DB 11 in response to the registry request (step S13), and sends a registry notification of the processing flows to the edit screen display module 24 (step S14). Consequently, registry results on the processing flows are displayed on the edit screen 31 by the edit screen display module 24 (step S15).

The production management method of the present embodiment may be executed by procedures other than those of the flowchart of FIG. 6. Furthermore, the flowchart of FIG. 6 can also be applied to third and fourth embodiments described later.

As described above, the present embodiment makes it possible to create and manage the processing flows of the wafers efficiently by editing the processing flows for each wafer, registering the common steps for each wafer group, and registering the dummy steps for each wafer. For example, the present embodiment is suitable for producing the trial semiconductor devices by using the group of wafers less than one lot as a processing unit.

The common steps and the dummy steps of the present embodiment may be set by operations other than the operation described above.

Third Embodiment

Figure 7:
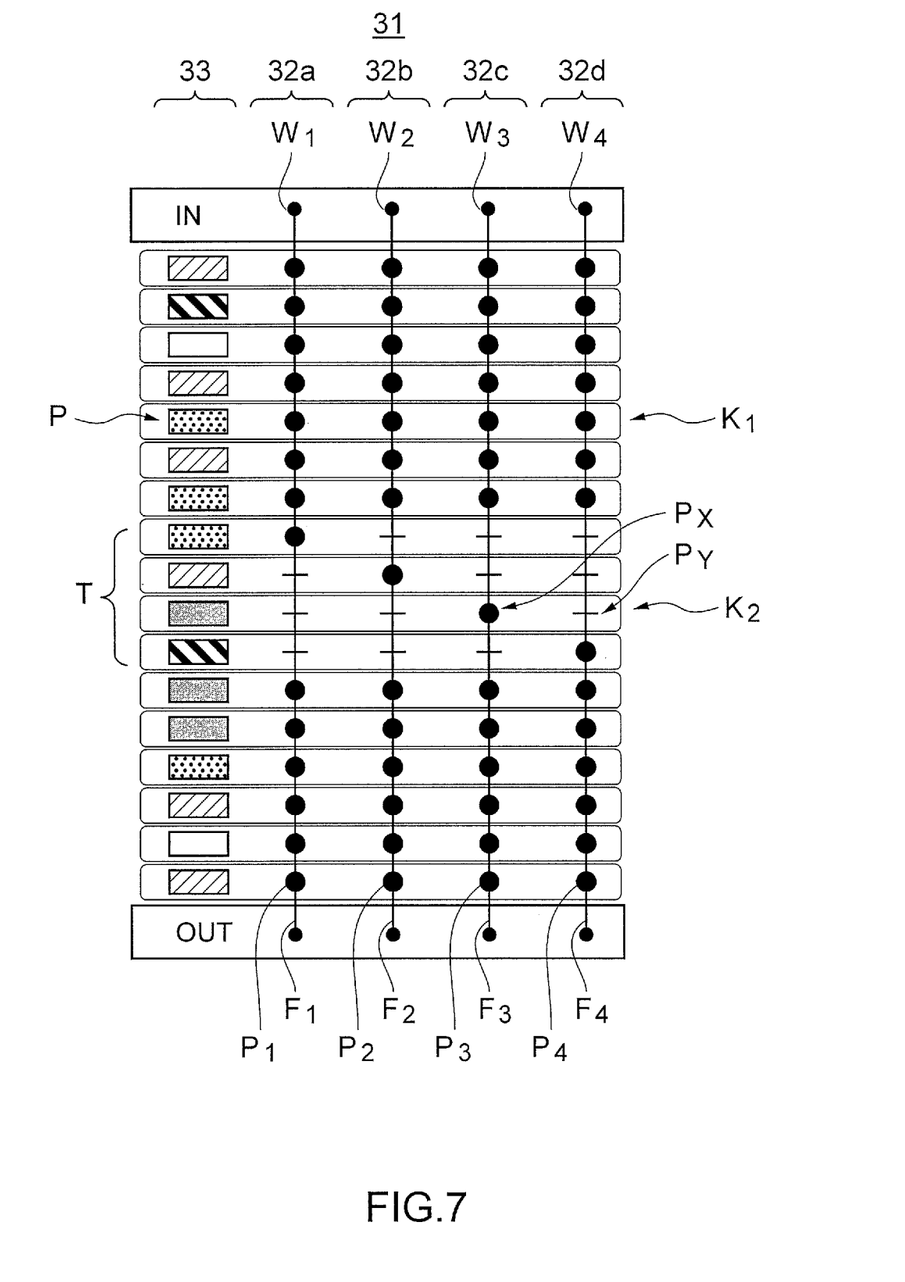
FIG. 7 is a diagram illustrating an edit screen of a production management method of a third embodiment.

FIG. 7 is a diagram illustrating an edit screen 31 of a production management method of a third embodiment. The production management method of the present embodiment is executed by the production management system of FIG. 4 similarly to the production management method of the second embodiment.

The edit screen 31 of FIG. 7 includes first to fourth editing areas 32a to 32d and a common step editing area 33.

The common step editing area 33 is used to edit the types of the common steps applied to the first to fourth wafers $W_1$ to $W_4$. A common step applied to the steps $P_1$ to $P_4$ of the stage $K_1$ is indicated by a reference sign P. When the common step P is to be set in the stage $K_1$, the stage $K_1$ area is clicked with the mouse in the common step editing area 33 to select the type of the common step P.

The first to fourth editing areas 32a to 32d are respectively used to edit a setting whether the common steps edited in the common step editing area 33 are applied to the first to fourth wafers $W_1$ to $W_4$. The setting of applying a common step to a step $P_3$ of the stage $K_2$ is indicated by a reference sign $P_X$, while the setting of applying a dummy step to a step $P_4$ of the stage $K_2$ is indicated by a reference sign $P_Y$. In this way, although the steps $P_1$ to $P_4$ of the second embodiment are indicated by symbols representing the types of the steps, the steps $P_1$ to $P_4$ of the present embodiment are represented by symbols indicating the setting whether the common steps are applied. In the present embodiment, the setting not to apply a common step to a step $P_4$ in the stage $K_2$ can be edited by clicking the step $P_4$ with the mouse in the stage $K_2$ of the fourth editing area 32d and setting the dummy step in the step $P_4$.

In the present embodiment, the common steps can be set for each wafer group, and the dummy steps can be set for each wafer. Therefore, the flow registry module 25 of the present embodiment registers the information of the common steps in the flow DB 11 for each wafer group, and the information of the dummy steps in the flow DB 11 for each wafer.

As described above, the present embodiment makes it possible to create and manage the processing flows of the wafers efficiently as in the second embodiment by editing the processing flows for each wafer, registering the common steps for each wafer group, and registering the dummy steps for each wafer.

Fourth Embodiment

Figure 8:
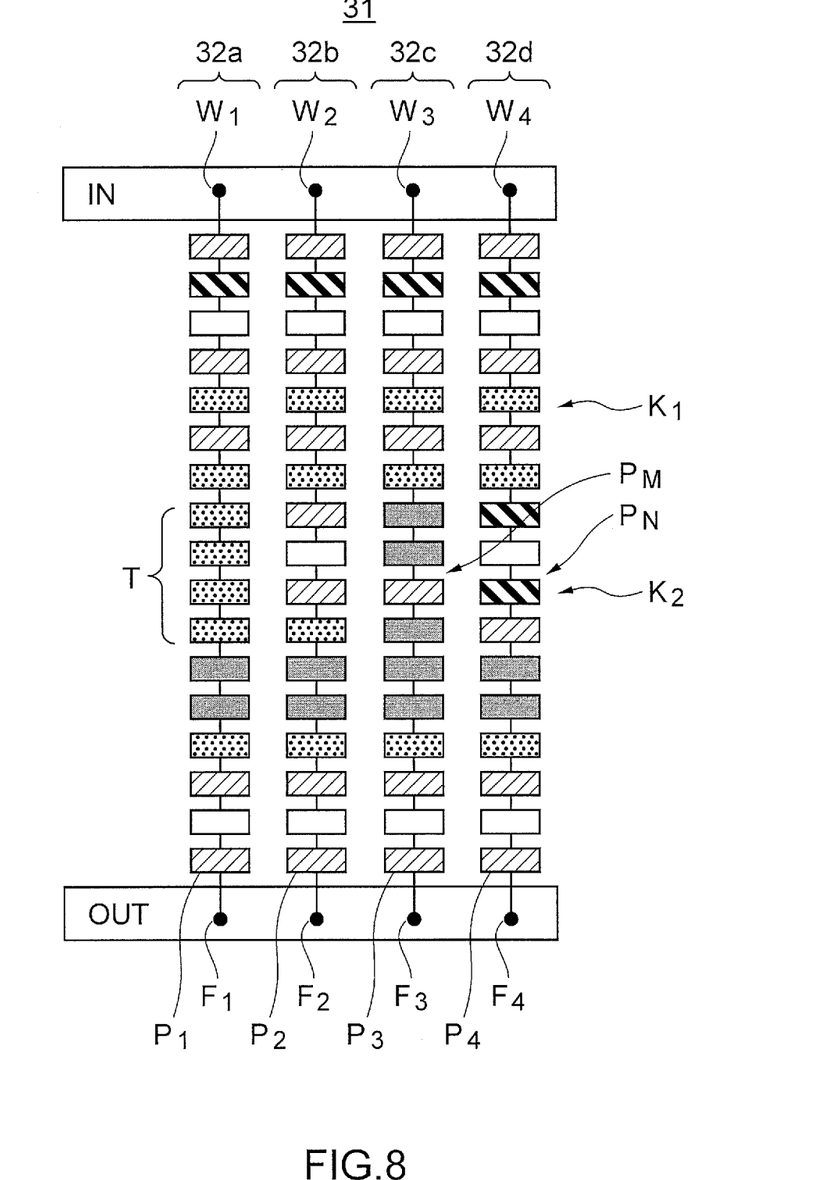
FIG. 8 is a diagram illustrating an edit screen of a production management method of the fourth embodiment.

FIG. 8 is a diagram illustrating an edit screen 31 of a production management method of the fourth embodiment.

The production management method of the present embodiment is executed by the production management system of FIG. 4, similarly to the production management method of the second and third embodiments.

The edit screens 31 of the second and third embodiments are capable of setting the common steps of simultaneously processing the first to fourth wafers $W_1$ to $W_4$ for each wafer group, and editing the setting whether the common steps should be applied to the first to fourth wafers $W_1$ to $W_4$ for each wafer.

Meanwhile, the edit screen 31 of the present embodiment is capable of setting individual steps of processing the first to fourth wafers $W_1$ to $W_4$ individually for each wafer. In an individual step, some of the first to fourth wafers $W_1$ to $W_4$ are processed separately from the other wafers. The first to fourth editing areas 32a to 32d of the present embodiment are used to edit the individual steps of the first to fourth wafers $W_1$ to $W_4$, respectively. In FIG. 8, an individual step $P_M$ is set in a step $P_3$ of the stage $K_2$, and an individual step $P_N$ is set in a step $P_4$ of the stage $K_2$. When the individual step $P_M$ is to be set in a step $P_3$ of the stage $K_2$, the step $P_3$ is clicked with the mouse in the stage $K_2$ to perform a type selecting operation of the individual step $P_M$.

In this way, the types of the steps $P_1$ to $P_4$ of the first to fourth wafers $W_1$ to $W_4$ can be set for each wafer in the present embodiment. If it is desired to simultaneously process the first to fourth wafers $W_1$ to $W_4$ in a particular stage as in the common steps of the second and third embodiments, such processing can be implemented by setting all the steps $P_1$ to $P_4$ in this stage to the same type. An example of this stage is indicated by the stage $K_1$ of FIG. 8. The flow registry module 25 of the present embodiment registers the information of the steps $P_1$ to $P_4$ of the first to fourth processing flows $F_1$ to $F_4$ in the flow DB 11 for each wafer.

As described above, the present embodiment makes it possible to create and manage the processing flows of the wafers efficiently and to increase a degree of freedom of editing the steps of the wafers by editing the processing flows for each wafer, editing the steps for each wafer, and registering the step information for each wafer. For example, the present embodiment is suitable for producing the trial semiconductor devices by using the group of wafers less than one lot as a processing unit.

The individual steps of the present embodiment may be set by an operation other than the operation described above.

Each production management method of the first to fourth embodiments may be executed by using a production management program which causes a computer to execute the method. For example, a non-transitory computer-readable recording medium containing the production management program may be prepared, and the production management program may be installed from the recording medium into the computer and executed in the computer. Examples of the recording medium are a CD-ROM, a DVD-ROM and the like. Alternatively, the production management program may be installed in a computer by downloading the production management program in the computer via a network such as LAN.

While certain embodiments have been described, these embodiments have been presented by way of example only, and are not intended to limit the scope of the inventions. Indeed, the novel apparatuses, methods and media described herein may be embodied in a variety of other forms; furthermore, various omissions, substitutions and changes in the form of the apparatuses, methods and media described herein may be made without departing from the spirit of the inventions. The accompanying claims and their equivalents are intended to cover such forms or modifications as would fall within the scope and spirit of the inventions.

The invention claimed is:

1. A production management apparatus comprising:
a display; and
a computer which executes a program to perform operations including:
displaying, on the display, an edit screen to edit first to Nth processing flows for simultaneously processing a group of first to Nth wafers, where N is an integer of two or more, wherein the edit screen includes first to Nth editing areas which respectively and simultaneously display, in an editable manner, steps of the first to Nth processing flows for respectively processing the first to Nth wafers, wherein the steps of the first to Nth processing flows are displayed so as to be grouped together in respective stages, wherein each stage crosses the first to Nth editing areas, and each stage includes one step from each of the first to Nth processing flows such that a kth stage includes a kth step of each of the first to Nth processing flows displayed in the respective first to Nth editing areas;
setting, in response to a first type of user input, steps among the steps of the first to Nth processing flows, as common steps, wherein each common step is a step that is simultaneously applied to multiple of the first to Nth wafers, wherein common steps of a same type and which are to be applied simultaneously to the multiple of the first to Nth wafers are displayed together in a same stage across the first to Nth editing areas;
performing, in response to a second type of user input, an editing operation of replacing at least one of the common steps with a dummy step in at least one of the first to Nth processing flows, and displaying the dummy step in place of the common step in the corresponding editing area and in the corresponding stage to which the replaced common step belongs, wherein the common step that is applied in the corresponding stage to other wafers among the first to Nth wafers is not applied to the wafer corresponding to the at least one of the first to Nth processing flows in which the dummy step has been set, wherein, upon completion of setting common steps and dummy steps, the computer displays the edit screen such that each stage includes, respectively, one of (i) no dummy steps and only common steps of a same type which are simultaneously applied to all of the first to Nth wafers in that stage, (ii) at least one dummy step and only one common step which is uniquely applied to one of the first to Nth wafers in said one of the first to Nth processing flows in which the common step is set, in that stage, and (iii) at least one dummy step and plural common steps of a same type which are simultaneously applied to multiple of the first to Nth wafers, excluding the wafer for which the dummy step has been set, in that stage, wherein a total number of the common steps and the dummy steps in each stage combined is equal to N, whereby each of the first to Nth processing flows are individually editable such that steps in the respective first to Nth processing flows can be uniquely set for the first to Nth wafers without using branches; and
registering the first to Nth processing flows edited on the edit screen in a database via a network, wherein the registering comprises registering information of the common steps with respect to the first to Nth wafers as a wafer group, and registering information of each dummy step with respect to a wafer to which the dummy step has been applied.

2. The apparatus of claim 1, wherein the edit screen includes a common step editing area for editing the common steps.

3. A semiconductor device production system comprising:
the production management apparatus of claim 1; and
at least one semiconductor production apparatus which is configured to process the first to Nth wafers according to the steps of the first to Nth processing flows edited and registered by the production management apparatus to produce semiconductor devices,
wherein the at least one semiconductor production apparatus simultaneously processes wafers for which common steps of a same type have been set in a given stage.

4. A production management method, comprising:
displaying, on a display, an edit screen to edit first to Nth processing flows for simultaneously processing a group of first to Nth wafers, where N is an integer of two or more, wherein the edit screen includes first to Nth editing areas which respectively and simultaneously display, in an editable manner, steps of the first to Nth processing flows for respectively processing the first to Nth wafers, wherein the steps of the first to Nth processing flows are displayed so as to be grouped together in respective stages, wherein each stage crosses the first to Nth editing areas, and each stage includes one step from each of the first to Nth processing flows such that a kth stage includes a kth step of each of the first to Nth processing flows displayed in the respective first to Nth editing areas;
setting, in response to a first type of user input, steps among the steps of the first to Nth processing flows, as common steps, wherein each common step is a step that is simultaneously applied to multiple of the first to Nth wafers, wherein common steps of a same type and which are to be applied simultaneously to the multiple of the first to Nth wafers are displayed together in a same stage across the first to Nth editing areas;
performing, in response to a second type of user input, an editing operation of replacing at least one of the common steps with a dummy step in at least one of the first to Nth processing flows, and displaying the dummy step in place of the common step in the corresponding editing area and in the corresponding stage to which the replaced common step belongs, wherein the common step that is applied in the corresponding stage to other wafers among the first to Nth wafers is not applied to the wafer corresponding to the at least one of the first to Nth processing flows in which the dummy step has been set, wherein, upon completion of setting common steps and dummy steps, the edit screen is displayed such that each stage includes, respectively, one of (i) no dummy steps and only common steps of a same type which are simultaneously applied to all of the first to Nth wafers in that stage, (ii) at least one dummy step and only one common step which is uniquely applied to one of the first to Nth wafers in said one of the first to Nth processing flows in which the common step is set, in that stage, and (iii) at least one dummy step and plural common steps of a same type which are simultaneously applied to multiple of the first to Nth wafers, excluding the wafer for which the dummy step has been set, in that stage, wherein a total number of the common steps and the dummy steps in each stage combined is equal to N, whereby each of the first to Nth processing flows are individually editable such that steps in the respective first to Nth processing flows can be uniquely set for the first to Nth wafers without using branches; and registering the first to Nth processing flows edited on the edit screen in a database via a network, wherein the registering comprises registering information of the common steps with respect to the first to Nth wafers as a wafer group, and registering information of each dummy step with respect to a wafer to which the dummy step has been applied.

5. A non-transitory computer-readable recording medium containing a program which causes a computer to perform operations comprising:

displaying, on a display, an edit screen to edit first to Nth processing flows for simultaneously processing a group of first to Nth wafers, where N is an integer of two or more, wherein the edit screen includes first to Nth editing areas which respectively and simultaneously display, in an editable manner, steps of the first to Nth processing flows for respectively processing the first to Nth wafers, wherein the steps of the first to Nth processing flows are displayed so as to be grouped together in respective stages, wherein each stage crosses the first to Nth editing areas, and each stage includes one step from each of the first to Nth processing flows such that a kth stage includes a kth step of each of the first to Nth processing flows displayed in the respective first to Nth editing areas;

setting, in response to a first type of user input, steps among the steps of the first to Nth processing flows, as common steps, wherein each common step is a step that is simultaneously applied to multiple of the first to Nth wafers, wherein common steps of a same type and which are to be applied simultaneously to the multiple of the first to Nth wafers are displayed together in a same stage across the first to Nth editing areas;

performing, in response to a second type of user input, an editing operation of replacing at least one of the common steps with a dummy step in at least one of the first to Nth processing flows, and displaying the dummy step in place of the common step in the corresponding editing area and in the corresponding stage to which the replaced common step belongs, wherein the common step that is applied in the corresponding stage to other wafers among the first to Nth wafers is not applied to the wafer corresponding to the at least one of the first to Nth processing flows in which the dummy step has been set, wherein, upon completion of setting common steps and dummy steps, the computer displays the edit screen such that each stage includes, respectively, one of (i) no dummy steps and only common steps of a same type which are simultaneously applied to all of the first to Nth wafers in that stage, (ii) at least one dummy step and only one common step which is uniquely applied to one of the first to Nth wafers in said one of the first to Nth processing flows in which the common step is set, in that stage, and (iii) at least one dummy step and plural common steps of a same type which are simultaneously applied to multiple of the first to Nth wafers, excluding the wafer for which the dummy step has been set, in that stage, wherein a total number of the common steps and the dummy steps in each stage combined is equal to N, whereby each of the first to Nth processing flows are individually editable such that steps in the respective first to Nth processing flows can be uniquely set for the first to Nth wafers without using branches; and registering the first to Nth processing flows edited on the edit screen in a database via a network, wherein the registering comprises registering information of the common steps with respect to the first to Nth wafers as a wafer group, and registering information of each dummy step with respect to a wafer to which the dummy step has been applied.

\* \* \* \* \*